United States Patent
Deepaganesh

(10) Patent No.: US 10,097,488 B2
(45) Date of Patent: Oct. 9, 2018

(54) SYSTEM AND METHOD FOR RECOVERING ELECTRONIC MAIL MESSAGES DELETED FROM AN INFORMATION HANDLING SYSTEM

(75) Inventor: Paulraj Deepaganesh, Bangalore (IN)

(73) Assignee: Dell Products, LP, Round Rock ( * ) Notice: Subject to any disclaimer, the term of this patent is extended or adjusted under 35 U.S.C. 154(b) by 151 days.

(21) Appl. No.: 13/474,324

(22) Filed: May 17, 2012

(65) Prior Publication Data
US 2013/0311431 A1  Nov. 21, 2013

(51) Int. Cl.
*G06F 17/30* (2006.01)
*H04L 12/58* (2006.01)
*G06Q 10/10* (2012.01)

(52) U.S. Cl.
CPC ........... *H04L 51/08* (2013.01); *G06Q 10/107* (2013.01)

(58) Field of Classification Search
CPC ......... G06F 17/30156; G06F 17/30902; G06F 17/00; G06F 17/30088; G06F 17/2205; G06F 17/30; G06F 17/30144; G06F 17/3015; G06F 17/30241; G06F 17/3087; G06F 17/30289; G06F 17/30345; G06F 17/30368; G06F 17/30887; G06F 17/30979; H04L 51/08; G06Q 10/107; G07F 17/32; G07F 17/323; G07F 17/3237
USPC .......................................... 707/647, 661, 674
See application file for complete search history.

(56) References Cited

U.S. PATENT DOCUMENTS

| | | | |
|---|---|---|---|
| 7,353,257 B2 | 4/2008 | Pettigrew et al. | |
| 7,567,965 B2 * | 7/2009 | Giacobbe | G06Q 10/107 |
| 7,636,742 B1 * | 12/2009 | Olavarrieta et al. | |
| 7,640,427 B2 * | 12/2009 | Callas et al. | 713/153 |
| 7,730,148 B1 | 6/2010 | Mace et al. | |
| 7,827,145 B1 * | 11/2010 | Spertus et al. | 707/647 |
| 7,849,140 B2 | 12/2010 | Abdel-Aziz et al. | |
| 7,865,548 B2 * | 1/2011 | Chen et al. | 709/203 |
| 7,921,176 B2 | 4/2011 | Madnani | |
| 8,037,097 B2 * | 10/2011 | Guo et al. | 707/792 |
| 8,165,177 B2 * | 4/2012 | Childs et al. | 370/546 |
| 2001/0051991 A1 * | 12/2001 | Beyda | G06Q 10/107 709/206 |
| 2002/0099828 A1 * | 7/2002 | Darby | 709/227 |
| 2003/0110227 A1 * | 6/2003 | O'Hagan | G06Q 10/107 709/206 |
| 2005/0102361 A1 * | 5/2005 | Winjum | G06Q 10/107 709/206 |
| 2005/0235008 A1 * | 10/2005 | Camping et al. | 707/202 |
| 2007/0043715 A1 * | 2/2007 | Kaushik | G06F 17/30386 |
| 2007/0192416 A1 * | 8/2007 | Gupta | G06Q 10/107 709/206 |
| 2008/0195708 A1 * | 8/2008 | Kirkland et al. | 709/206 |
| 2010/0312843 A1 * | 12/2010 | Robinson et al. | 709/206 |
| 2011/0138446 A1 * | 6/2011 | Barrett et al. | 726/3 |
| 2012/0246703 A1 * | 9/2012 | MacLeod et al. | 726/4 |

* cited by examiner

Primary Examiner — Scott A. Waldron
Assistant Examiner — Andalib F Lodhi
(74) Attorney, Agent, or Firm — Larson Newman, LLP

(57) ABSTRACT

An information handling system detects that a first electronic mail message has been permanently deleted from a local memory of a first information handling system, generates a second electronic mail message to request a recovery of the first electronic mail message, attaches a file to the second electronic mail message, and sends the second electronic mail message to a plurality of second information handling systems.

20 Claims, 6 Drawing Sheets

SYSTEM AND METHOD FOR RECOVERING ELECTRONIC MAIL MESSAGES DELETED FROM AN INFORMATION HANDLING SYSTEM

FIELD OF THE DISCLOSURE

This disclosure generally relates to information handling systems, and more particularly relates to a system and method for recovering electronic mail messages deleted from an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

An electronic mail (email) server can transfer messages to and from an information handling system. The email server can store a copy of each message that passes through the email server in a local memory. However, if a storage limit of the local memory of the email server is exceeded, the email server can send the email messages to the information handling system and delete the email message from the local storage. When the information handling system receives the email messages from the email server, the information handling system can create or assign a memory location within a local hard disk drive of the information handling system to store the email messages. When the email messages have been stored in the local hard disk of the information handling system, the server may no longer store a copy of the email messages.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application.

Figure 1:
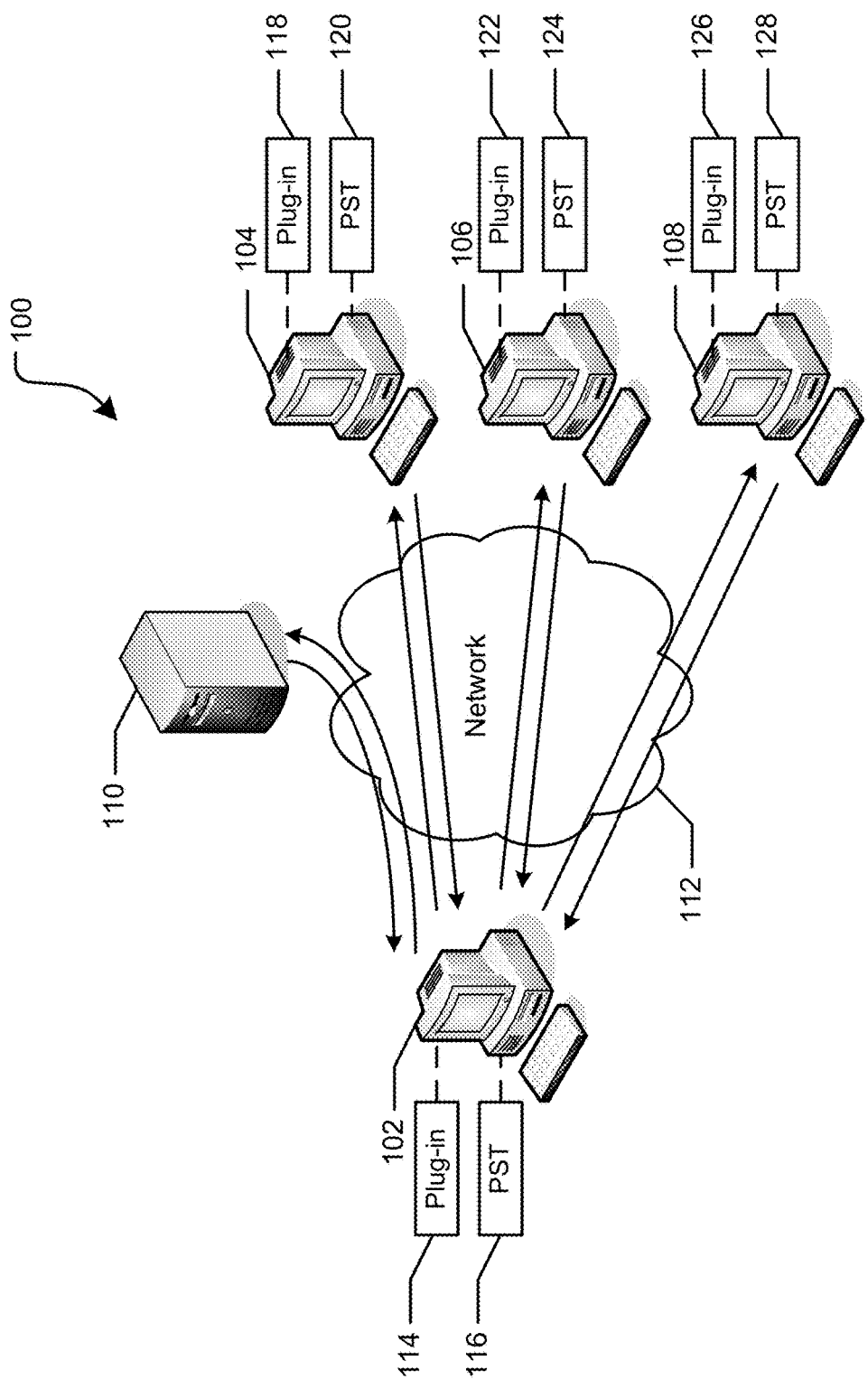
FIG. 1 is a block diagram of an electronic mail message system.

FIG. 1 shows an electronic mail (email) message system 100 including multiple information handling systems 102, 104, 106, and 108. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

The email message system 100 also includes a mail server 110 and a network 112. The information handling system 102 is in communication with each of the other information handling systems 104, 106, and 108 and with the mail server 110 via the network 112. The information handling system 102 includes a plug-in application 114 and personal folder Files (PST) 116. The information handling system 104 includes a plug-in application 118 and a PST 118. The information handling system 106 includes a plug-in application 122 and PST 124. The information handling system 108 includes a plug-in application 126 and PST 128. Each of the information handling systems 102, 104, 106, and 108 can send email messages to one of the other information handling systems via the mail server 110, or can send email messages directly to the other information handling systems via a client-to-client communication. For simplicity, only communications to and from the information handling system 102 are shown in FIG. 1.

The mail server 110 can receive emails addressed to or from one of the information handling systems 102, 104, 106, and 108. When the email is received, the mail server 110 can save a copy of the email in a local memory of the mail server and then send the email to the destination information handling system 102, 104, 106, or 108. The email can either be pushed to or pulled by the corresponding information handling system 102, 104, 106, or 108. If the mail server 110 reaches a storage limit of the local memory of the mail server, the mail server can send the emails stored in the local memory to the information handling system 102, 104, 106, or 108 associated with the emails and then delete the emails from the local memory. For example, the mail server 110 can send the information handling system 102 emails that are either sent from or sent to that information handling system when the storage limit of the server is exceeded. The information handling system 102 can then store these emails in the PST 116. If one or more of the emails in the PST 116 are deleted, the information handling system 102 may need to recover those emails from the other information handling systems 104, 106, and 108. One of ordinary skill in the art will recognize that each of the information handling systems 102, 104, 106, and 108 can operate in substantially the same manner. Thus, the operation of recovering lost emails will be described only with respect to information handling system 102.

The email recovery plug-in 114 can be executed along with an email application of the information handling system 102. When a user determines that emails have been permanently deleted from the PST 116, the user can launch the email recovery plug-in 114 to recover the deleted emails. The plug-in 114 can then create a request to recover the deleted emails from one of the other information handling systems 104, 106, and 108. In an embodiment, the request can be a recovery email 202 as shown in FIG. 2.

Figure 2:
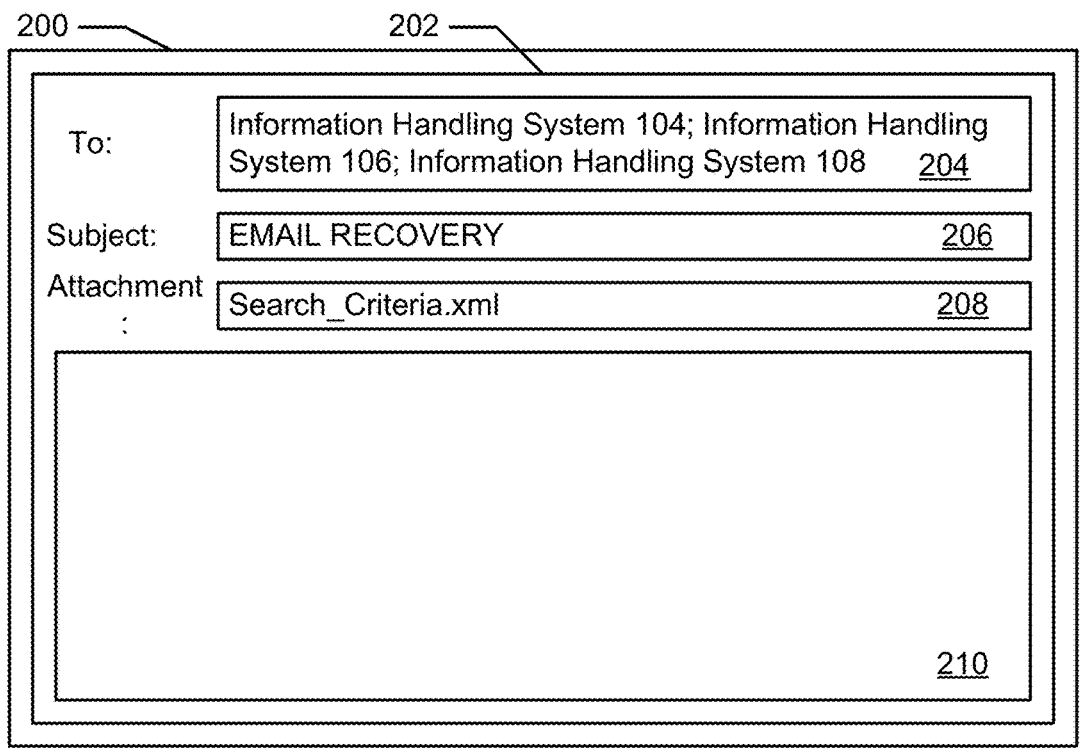
FIG. 2 shows an exemplary electronic mail message associated with the electronic mail message system.

FIG. 2 shows a display unit 200 of the information handling system 104 including the recovery email 202, that in turn includes an addressed to line 204, a subject line 206, an attachment 208, and a message 210. The plug-in 114 can retrieve a list of email addresses for devices, such as information handling systems 104, 106, and 108, that may have copies of the emails deleted from the PST 116. In an embodiment, the list of devices can be generated based on contacts in the email application, business contacts, or the like. The plug-in 114 can then insert all of the email addresses in the list of email addresses in the addressed to line 204, and can enter "EMAIL RECOVERY" into the subject line 206.

The plug-in 114 can then determine different search criteria associated with the deleted emails, such as a size range, a date range, subject line keywords, and message body keywords. For example, the size range can be a request for any emails associated with the information handling system 102 that are less than thirty Kilobytes in size, that are between twenty and one hundred Kilobytes in size, and the like. The date range can be any emails sent to or received from the information handling system 102 before a certain date, during a particular year, or the like. The subject line and message body keywords can be words to search for that may be associated with a particular project name, with an event, with a person, or the like.

The plug-in 114 can then compile the search criteria along with an authentication digital signature into an extensible markup language (XML) file, which can be attached to the recovery email 202 as the attachment 208. The plug-in 114 can leave the message 210 blank. When plug-in 114 completes the recovery email 202, the plug-in 114 can send the recovery email to each of the information handling systems 104, 106, and 108 listed in the addressed to line 204.

Referring back to FIG. 1, the information handling system 102 can send the recovery email 202 directly to each of the information handling systems 104, 106, and 108 via the network 112 without the recovery email being routed through the mail server 110. The recovery email 202 can be sent to the other information handling systems 104, 106, and 108 via a client-to-client communication. The plug-ins 118, 122, and 126 of the respective information handling systems 104, 106, and 108 can run along with an email application executed on the information handling systems, and scan the subject line of email messages received by the email application to determine whether an email recovery request has been received. Thus, when the recovery email 202 is received at the information handling system 104 the plug-in 118 can scan the subject line 206 of the recovery email, and can determine that the recovery email is an email recovery request based on the subject line in the recovery email including the words "EMAIL RECOVERY."

The plug-in 118 can then download the attachment 208 of the recovery email 202, and parse the search criteria XML file of the attachment to determine the search criteria for the email recovery request and to authenticate the recovery email. The plug-in 118 can authenticate the recovery email 202 by verifying the digital signature included in the search criteria XML file. When plug-in 118 verifies the recovery email 202, the plug-in 118 can display a message 302 on a display device 300 of the information handling system 104 as shown in FIG. 3.

Figure 3:
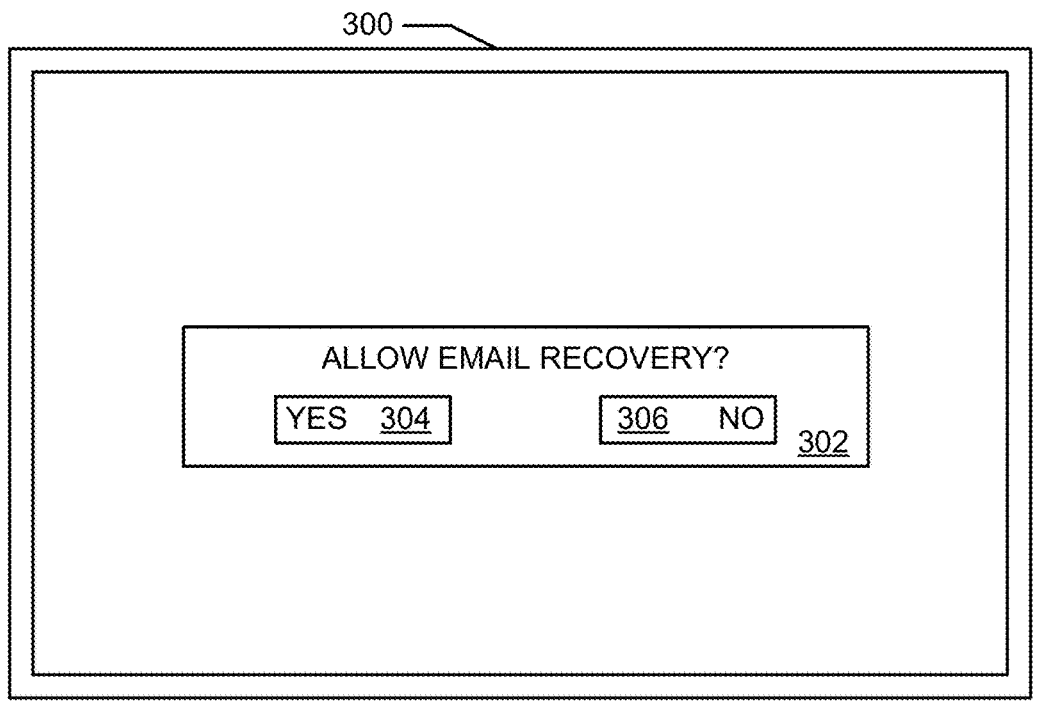
FIG. 3 is an exemplary screen shot displaying an electronic mail recovery message.

FIG. 3 shows the display device 300 including the message 302, a YES selectable icon 304, and a NO selectable icon 306. The plug-in 118 can display the message 302 to determine whether a user of the information handling system 104 wants to allow the plug-in to perform the email recovery requested by the recovery email 202. If the YES selectable icon 304 is selected the plug-in 118 can perform the email recovery. However, if the NO selectable icon 306 is selected, the plug-in 118 will not perform the email recovery. In an embodiment, the user of the information handling system can set a global default to allow all email recovery requests in the plug-in 118, that in turn can cause the plug-in to perform email recovery operations without seeking permission from the user.

Referring back to FIG. 1, the plug-in 118 can then perform the email recovery by searching the PST 120, an inbox folder of the email application on the information handling system 104, and sent folder of the email application, and the like. When the plug-in 118 has searched all of the emails stored in the information handling system 104, the plug-in can store any emails that match the search criteria in a local memory of the information handling system 104. The plug-in 118 can then generate an email recovery response 400 as shown in FIG. 4.

Figure 4:
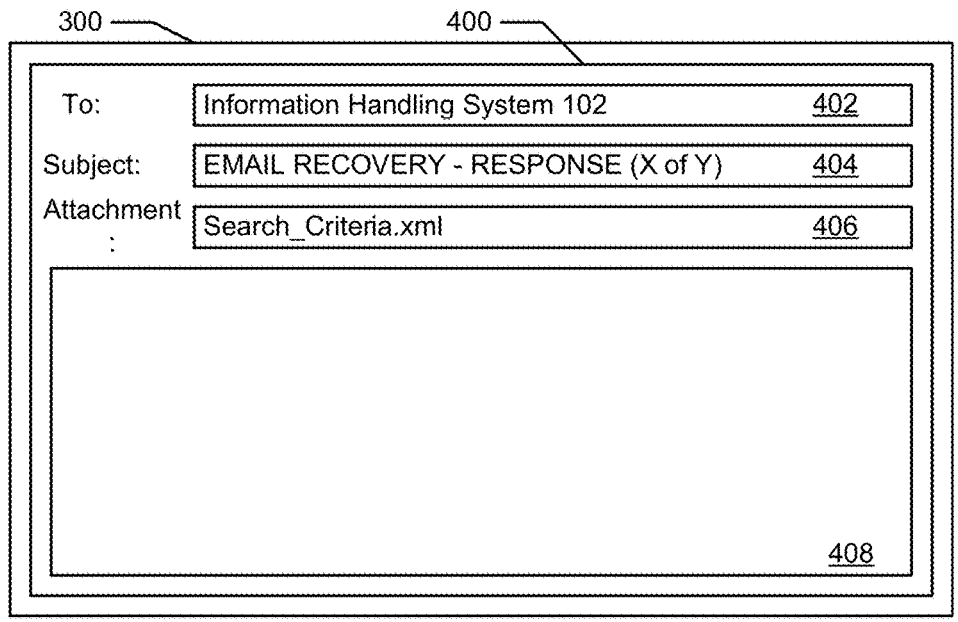
FIG. 4 shows an electronic mail message recovery response associated with the electronic mail message system.

FIG. 4 shows the display device 300 of the information handling system 104 including the email recovery response 400, that in turn includes an addressed to line 402, a subject line 404, attachments 406, and a message 408. Because the email recovery response 400 is sent to the device that sent the email recovery request, the plug-in 118 can include the information handling system 102 in the addressed to line 402. The plug-in 118 can attach the search criteria XML file and the emails identified to match the search result as attachments 406 to the email recovery response 400. If a size of the identified emails is too large for one email, the plug-in 118 can divide the response into multiple emails and can include "EMAIL RECOVERY—RESPONSE (X of Y)" in the subject line of each of the response emails containing the identified emails. Otherwise, the plug-in 118 can include "EMAIL RECOVERY—RESPONSE" in the subject line 404. The plug-in 118 can leave the message 408 blank.

Referring back to FIG. 1, the information handling system 104 can then send the email recovery response 400 to the information handling system 102 via a client-to-client communication. The information handling system 102 can also receive email recovery responses from the other information handling systems 106 and 108 including the emails identified by the respective plug-ins 122 and 126 based on searching the respective PST 124 and 128. The plug-in 114 can detect the email recovery responses based on the subject lines including "EMAIL RECOVERY—RESPONSE (X of Y)" or "EMAIL RECOVERY—RESPONSE." The plug-in 114 can then download all of the emails attached to the email recovery responses, and can compare the recovered emails to determine whether there are any duplicates. If there are duplicates, the plug-in 114 can delete the duplicates so that only one email of each set of duplicates remains. The plug-in 114 can then store the recovered emails in the PST 116 and in the proper folder of the email application executed by the information handling system 102.

Figure 5:
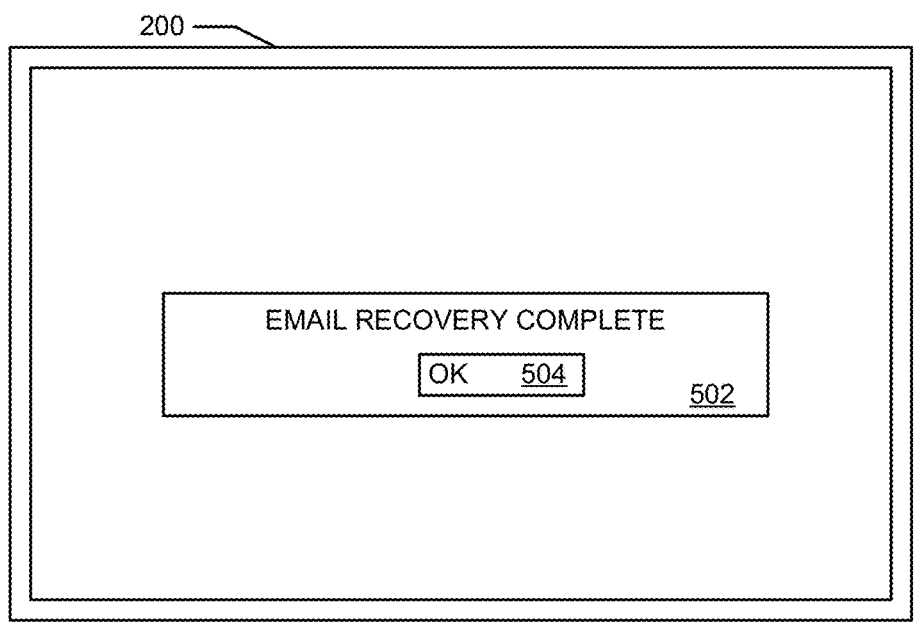
FIG. 5 is an exemplary screen shot displaying an electronic mail recovery complete message.

For example, the plug-in 114 can place any recovered email that was originally sent from the information handling system 102 into a sent folder of the email application of the information handling system. Also, the plug-in 114 can place any recovered email that was originally sent to the information handling system 102 into an inbox folder of the email application of the information handling system. After the plug-in 114 has stored the recovered emails in the PST 116 and placed the emails in the proper folders, the plug-in 114 can display an email recovery complete message 502 on the display device 200 of the information handling system 102. The user of the information handling system 102 can close the email recovery complete message 502 by selecting a selectable OK icon 504 within the email recovery complete message as shown in FIG. 5.

Figure 6:
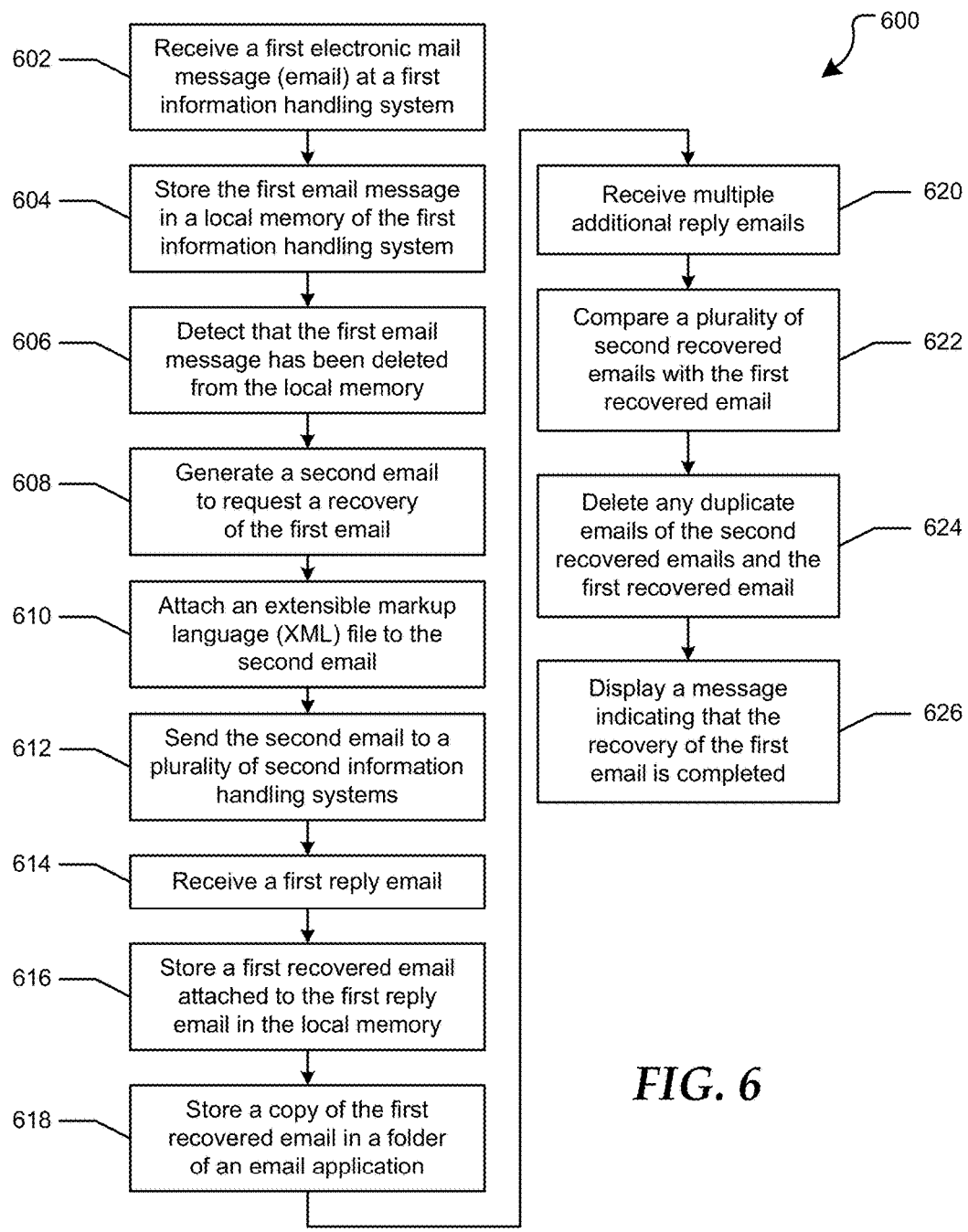
FIG. 6 is a flow diagram of a method for controlling recovery of the electronic mail message in the electronic mail message system.

FIG. 6 shows a method 600 for controlling electronic mail message recovery in the electronic mail message system 100. At block 602, a first electronic mail message is received at a first information handling system from a server in response to a storage capacity of the server being exceeded. The first electronic mail message received from the server is stored into a local memory of the first information handling system at block 604. At block 606, detect that the first electronic mail message has been permanently deleted from a local memory of the first information handling system. A second electronic mail message is generated to request a recovery of the first electronic mail message at block 608. At block 610, an XML file is attached to the second electronic mail message. The XML file can include search criteria associated with the recovery of the first electronic mail message, and the search criteria can be a size range, a date range, subject line keywords, and message body keywords.

At block 612, the second electronic mail message is sent to a plurality of second information handling systems. A reply electronic mail message is received from one of the plurality of second information handling systems at block 614. The reply electronic mail message can include a first recovered electronic mail message. At block 616, the first recovered electronic mail message attached to the reply electronic mail message is stored in the local memory of the first information handling system. A copy of the first recovered electronic mail message is stored in a folder of an email application of the first information handling system at block 618. At block 620, multiple additional reply electronic mail messages including a plurality of second recovered electronic mail messages that match the search criteria are received. The plurality of second recovered electronic mail messages and the first recovered electronic mail message are compared at block 622. At block 624, any duplicate electronic mail messages of the plurality of second recovered electronic mail messages and the first reply electronic mail message are deleted. A message is displayed on a display device of the information handling system indicating that the recovery of the first electronic mail message was successful at block 626.

Figure 7:
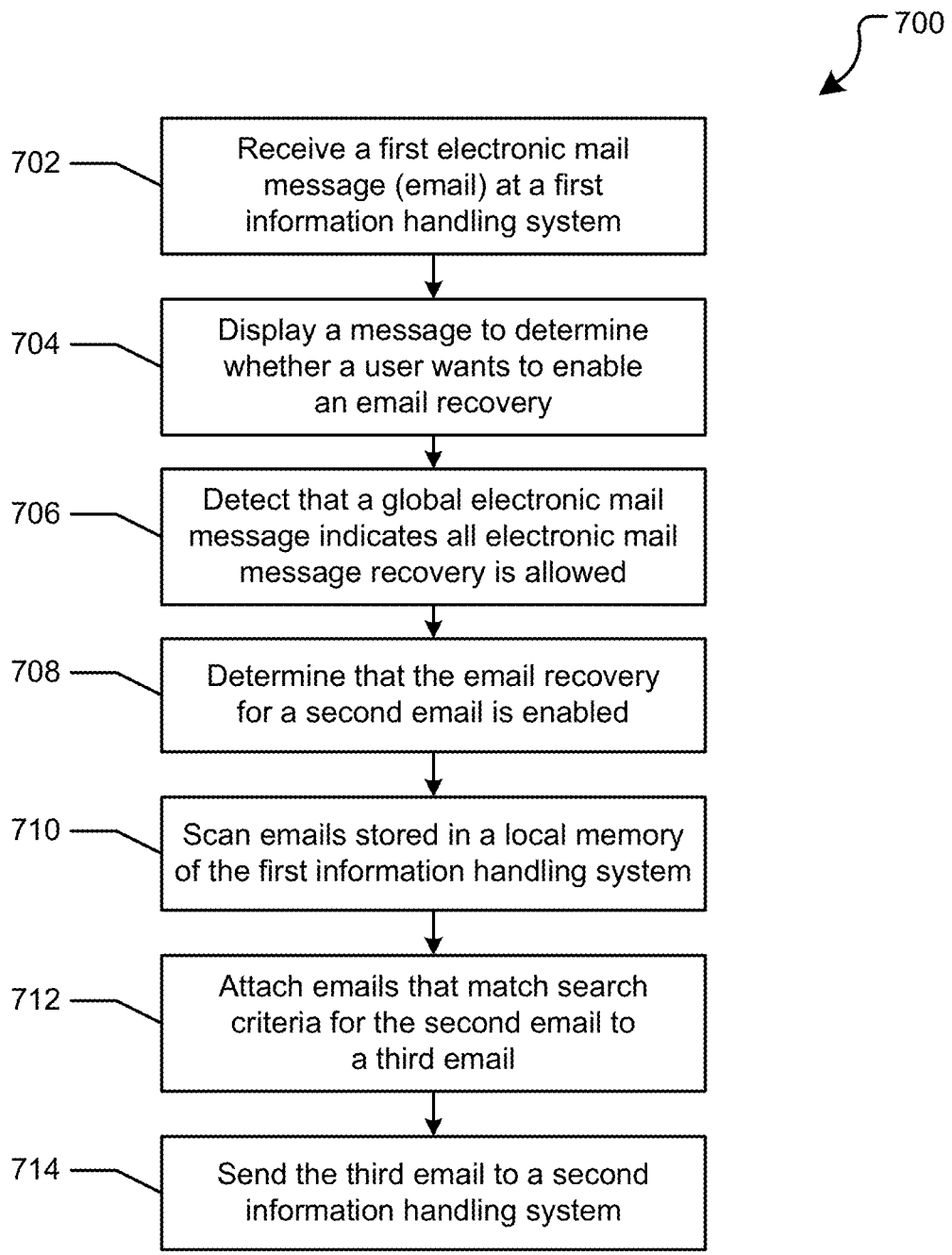
FIG. 7 is a flow diagram of another method for controlling recovery of the electronic mail message in the electronic mail message system.

FIG. 7 shows another method 700 for controlling electronic mail message recovery in the electronic mail message system 100. At block 702, a first electronic mail message requesting a recovery of a second electronic mail message is received at a first information handling system. The first electronic mail message can be received from a second information handling system, and can include search criteria associated with the second electronic mail message. The search criteria can be a size range, a date range, subject line keywords, message body keywords, and the like. A message is displayed on a display device of the first information handling system at block 704. In an embodiment, the message asks whether a user wants to enable the electronic mail message recovery. At block 706, a global electronic mail message recovery is detected. In an embodiment, the global electronic mail message recovery can indicate that all electronic mail message recovery is allowed. A determination is made at the first information handling system that electronic mail message recovery is enabled at block 708. At block 710, electronic mail messages stored in the first information handling system are scanned for electronic mail messages that match the search criteria. At block 712, the electronic mail messages that match the search criteria are attached to a third electronic mail message. The third electronic mail message is sent to the second information handling system as a reply to the first electronic mail message at block 714. In an embodiment, a subject line of the third electronic mail message can include particular words to indicate that the third electronic mail message is a response to an electronic mail message recovery request.

Figure 8:
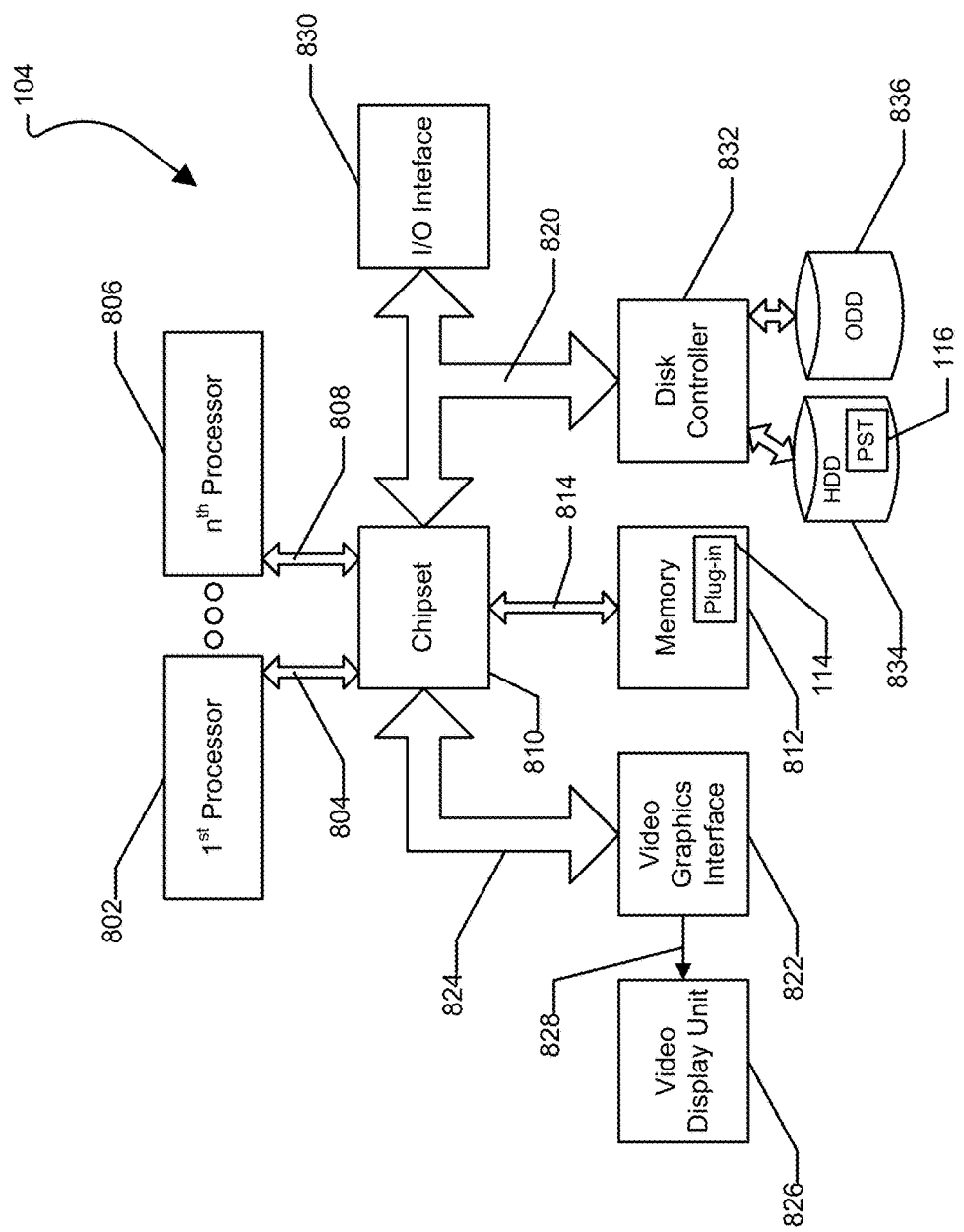
FIG. 8 is a block diagram of a general information handling.

FIG. 8 shows a general information handling system 800, such as information handling system 102 of FIG. 1, that can include a first physical processor 802 coupled to a first host bus 804 and can further include additional processors generally designated as $n^{th}$ physical processor 806 coupled to a second host bus 808. The first physical processor 802 can be coupled to a chipset 810 via the first host bus 804. Further, the $n^{th}$ physical processor 806 can be coupled to the chipset 810 via the second host bus 808. The chipset 810 can support multiple processors and can allow for simultaneous processing of multiple processors and support the exchange of information within information handling system 800 during multiple processing operations.

According to one aspect, the chipset 810 can be referred to as a memory hub or a memory controller. For example, the chipset 810 can include an Accelerated Hub Architecture (AHA) that uses a dedicated bus to transfer data between first physical processor 802 and the $n^{th}$ physical processor 806. For example, the chipset 810, including an AHA enabled-chipset, can include a memory controller hub and an input/output (I/O) controller hub. As a memory controller hub, the chipset 810 can function to provide access to first physical processor 802 using first bus 804 and $n^{th}$ physical processor 806 using the second host bus 808. The chipset 810 can also provide a memory interface for accessing memory 812 using a memory bus 814. In a particular embodiment, the buses 804, 808, and 814 can be individual buses or part of the same bus. The chipset 810 can also provide bus control and can handle transfers between the buses 804, 808, and 814.

According to another aspect, the chipset 810 can be generally considered an application specific chipset that provides connectivity to various buses, and integrates other system functions. For example, the chipset 810 can be provided using an Intel® Hub Architecture (IHA) chipset that can also include two parts, a Graphics and AGP Memory Controller Hub (GMCH) and an I/O Controller Hub (ICH). For example, an Intel 820E, an 815E chipset, or any combination thereof, available from the Intel Corporation of Santa Clara, Calif., can provide at least a portion of the chipset 810. The chipset 810 can also be packaged as an application specific integrated circuit (ASIC).

The information handling system 800 can also include a video graphics interface 822 that can be coupled to the chipset 810 using a third host bus 824. In one form, the video graphics interface 822 can be an Accelerated Graphics Port (AGP) interface to display content within a video display unit 826. Other graphics interfaces may also be used. The video graphics interface 822 can provide a video display output 828 to the video display unit 826. The video display unit 826 can include one or more types of video displays such as a flat panel display (FPD) or other type of display device.

The information handling system 800 can also include an I/O interface 830 that can be connected via an I/O bus 820 to the chipset 810. The I/O interface 830 and I/O bus 820 can include industry standard buses or proprietary buses and respective interfaces or controllers. For example, the I/O bus 820 can also include a Peripheral Component Interconnect (PCI) bus or a high speed PCI-Express bus. In one embodiment, a PCI bus can be operated at approximately 96 MHz and a PCI-Express bus can be operated at more than one speed, such as 2.5 GHz and 4 GHz. PCI buses and PCI-Express buses can be provided to comply with industry standards for connecting and communicating between various PCI-enabled hardware devices. Other buses can also be provided in association with, or independent of, the I/O bus 820 including, but not limited to, industry standard buses or proprietary buses, such as Industry Standard Architecture (ISA), Small Computer Serial Interface (SCSI), Inter-Integrated Circuit (I²C), System Packet Interface (SPI), or Universal Serial buses (USBs).

In an alternate embodiment, the chipset 810 can be a chipset employing a Northbridge/Southbridge chipset configuration (not illustrated). For example, a Northbridge portion of the chipset 810 can communicate with the first physical processor 802 and can control interaction with the memory 812, the I/O bus 820 that can be operable as a PCI bus, and activities for the video graphics interface 822. The Northbridge portion can also communicate with the first physical processor 802 using first bus 804 and the second bus 808 coupled to the $n^{th}$ physical processor 806. The chipset 810 can also include a Southbridge portion (not illustrated) of the chipset 810 and can handle I/O functions of the chipset 810. The Southbridge portion can manage the basic forms of I/O such as Universal Serial Bus (USB), serial I/O, audio outputs, Integrated Drive Electronics (IDE), and ISA I/O for the information handling system 800.

The information handling system 800 can further include a disk controller 832 coupled to the I/O bus 820, and connecting one or more internal disk drives such as a hard disk drive (HDD) 834 and an optical disk drive (ODD) 836 such as a Read/Write Compact Disk (R/W CD), a Read/Write Digital Video Disk (R/W DVD), a Read/Write mini-Digital Video Disk (R/W mini-DVD), or other type of optical disk drive.

In an embodiment, the HDD 834 can include the PST 116 associated with an email application executed by the processors 802 and 806. The PST 116 can be utilized to archive emails received from the mail server 110. The emails stored in the PST 116 can be received at the information handling system 800 from the mail server 110 via the I/O interface 830 when the mail server has exceeded the storage limit in a local memory of the mail server. Thus, when the information handling system 800 stores emails from the mail server 110 into the PST 116, those emails are no longer stored in the mail server. Therefore, an email in the PST 116 would not be recoverable from the mail server 110 if it is deleted from the PST, or if the entire PST is lost during a failure of the HDD 834 or a failure of the information handling system 800.

The memory 812 can include the email recovery plug-in 114 that can be executed by the processors 802 and 806 along with the email application of the information handling system 800. Execution of the email recovery plug-in 114 can be substantially similar to the operation described above with respect to FIGS. 1-6. Thus, the plug-in 114 can determine that one or more emails have be deleted from the PST 116, and in response can trigger a request to recover one of the other information handling systems 104, 106, and 108. The request can be the recovery email 202 can be sent to the information handling systems 104, 106, and 108 via the I/O interface 830 and the network 112 of FIG. 1. The plug-in 114 can then receive email recover responses, delete duplicate emails, and store the remaining emails in the PST 116 and in proper folders of the email application based on rules set in the email application.

Although only a few exemplary embodiments have been described in detail in the exemplary embodiments without materially departing from the novel teachings and advantages of the embodiments of the present disclosure. For example, the methods described in the present disclosure can be stored as instructions in a computer readable medium to cause a processor, such as chipset 210, to perform the method. Additionally, the methods described in the present disclosure can be stored as instructions in a non-transitory computer readable medium, such as a hard disk drive, a solid state drive, a flash memory, and the like. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
   detecting that a first electronic mail message has been permanently deleted from a local memory of a first information handling system;
   generating a second electronic mail message to request a recovery of the first electronic mail message;
   attaching a file to the second electronic mail message, the file including search criteria associated with the recovery of the first electronic mail message;
   sending the second electronic mail message to a plurality of second information handling systems;
   receiving a reply electronic mail message from one of the second information handling systems, the reply electronic mail message including a first recovered electronic mail message as an attachment to the reply electronic mail message;

downloading the first recovered electronic mail message from the reply electronic mail message;

storing the first recovered electronic mail message attached to the reply electronic mail message in the local memory of the first information handling system; and storing a copy of the first recovered electronic mail message in a folder of an email application of the first information handling system.

2. The method of claim 1 further comprising:

receiving multiple additional reply electronic mail messages including a plurality of second recovered electronic mail messages that match the search criteria;

comparing the second recovered electronic mail messages and the first recovered electronic mail message; and deleting any duplicate electronic mail messages of the second recovered electronic mail messages and the first reply electronic mail message.

3. The method of claim 1 further comprising:

displaying a message on a display device of the information handling system indicating that the recovery of the first electronic mail message was successful.

4. The method of claim 1 further comprising:

receiving the first electronic mail message from a server in response to a storage capacity of the server being exceeded; and storing the first electronic mail message received from the server into the local memory of the first information handling system prior to detecting that the first electronic mail message has been deleted from the local memory.

5. The method of claim 1 wherein the search criteria for the first electronic mail message is selected from a group consisting of a size range, a date range, subject line keywords, and message body keywords.

6. The method of claim 1 wherein a subject line of the second mail message includes particular words to indicate that the second electronic mail message is an electronic mail message recovery request.

7. The method of claim 1 wherein the second electronic mail message is sent to each of the second information handling systems via a client-to-client communication.

8. A method comprising:

receiving, at a first information handling system, a first electronic mail message requesting a recovery of a second electronic mail message, wherein the first electronic mail message is from a second information handling system, and wherein the first electronic mail message includes search criteria associated with the second electronic mail message;

determining, at the first information handling system, that electronic mail message recovery is enabled;

scanning electronic mail messages stored in the first information handling system for matches that match the search criteria;

attaching the matches to a third electronic mail message; and sending the third electronic mail message to the second information handling system as a reply to the first electronic mail message.

9. The method of claim 8 further comprising:

displaying a message on a display device of the first information handling system, wherein the message asks whether a user wants to enable the electronic mail message recovery.

10. The method of claim 8 further comprising:

detecting a global electronic mail message recovery prior to the determining that the electronic mail message recovery is enabled, wherein the global electronic mail message recovery indicates that all electronic mail message recovery is allowed.

11. The method of claim 8 wherein the search criteria is selected from a group consisting of a size range, a date range, subject line keywords, and message body keywords.

12. The method of claim 8 wherein a subject line of the third electronic mail message includes particular words to indicate that the third electronic mail message is a response to an electronic mail message recovery request.

13. The method of claim 8 wherein the first electronic mail message is received from the second information handling system via a client-to-client communication.

14. An information handling system comprising:

a memory; and a set of instruction stored in the memory executable by a processor to cause the processor to:

detect that a first electronic mail message has been permanently deleted from a local memory of a first information handling system;

generate a second electronic mail message to request a recovery of the first electronic mail message;

attach a file to the second electronic mail message, the file including search criteria associated with the recovery of the first electronic mail message, the file also including a digital authentication signature that is utilized to verify the second electronic mail message;

send the second electronic mail message to a second information handling systems;

receive a reply electronic mail message from one of the second information handling systems the reply electronic mail message including a first recovered electronic mail message as an attachment to the reply electronic mail message;

store the first recovered electronic mail message attached to the reply electronic mail message in the local memory of the first information handling system; and store a copy of the first recovered electronic mail message in a folder of an email application of the first information handling system.

15. The information handling system of claim 14 wherein the set of instruction further cause the processor to:

receive multiple additional reply electronic mail messages including a plurality of second recovered electronic mail messages that match the search criteria;

compare the second recovered electronic mail messages and the first recovered electronic mail message; and delete any duplicate electronic mail messages of the second recovered electronic mail messages and the first reply electronic mail message.

16. The information handling system of claim 14 wherein the set of instruction further cause the processor to:

display a message on a display device of the information handling system indicating that the recovery of the first electronic mail message was successful.

17. The information handling system of claim 14 wherein the set of instruction further cause the processor to:

receive the first electronic mail message from a server in response to a storage capacity of the server being exceeded; and store the first electronic mail message received from the server into the local memory of the information handling system prior to detecting that the first electronic mail message has been deleted from the local memory.

18. The information handling system of claim 14 wherein the search criteria for the first electronic mail message is selected from a group consisting of a size range, a date range, subject line keywords, and message body keywords.

19. The information handling system of claim 14 wherein a subject line of the second mail message includes particular words to indicate that the second electronic mail message is an electronic mail message recovery request.

20. The information handling system of claim 14 wherein the second electronic mail message is sent to each of the plurality of second information handling systems via a client-to-client communication.

* * * * *